United States Patent [19]

Suzuki

[11] 4,379,858
[45] Apr. 12, 1983

[54] FOAMED PLASTICS

[76] Inventor: Hirosuke Suzuki, 4-21-8 Kotesashi-cho, Tokorozawa, Japan

[21] Appl. No.: 410,325

[22] Filed: Aug. 23, 1982

[30] Foreign Application Priority Data

Aug. 28, 1981 [JP] Japan ................................ 56-134934

[51] Int. Cl.³ ............................................. C08J 9/24
[52] U.S. Cl. ...................................... 521/54; 521/134; 525/199; 525/200
[58] Field of Search .................. 521/54, 134; 525/199, 525/200

[56] References Cited

U.S. PATENT DOCUMENTS 2,806,509 9/1957 Bozyocco et al. ..................... 521/54
3,296,153 1/1967 Suogren ................................ 521/54

Primary Examiner—Morton Foelak
Attorney, Agent, or Firm—John S. Campbell

[57] ABSTRACT

A melt-molded foamed plastic composition comprised of a tetrafluoroethylene-perfluoroalkyl vinyl ether resin matrix in which is admixed stretched porous fragments of polytetrafluoroethylene.

1 Claim, 2 Drawing Figures

FOAMED PLASTICS

BACKGROUND OF THE INVENTION

1. Field of the Invention

The present invention relates to foamed plastics which can be molded economically.

2. Discussion of the Prior Art

The conventional foamed plastics have been produced by the following three methods.

The first method is based on chemical foaming, in which a blowing agent is mixed into a resin raw material and the foamed plastics are formed by melt-extrusion. This method is disadvantageous in that the temperature should be controlled uniformly and the extent of foaming and the cell size vary greatly depending on the amount of time which has passed after mixing of the blowing agent. The second method is based on gas blowing, in which the resin raw material or the nucleating agent mixed into the resin raw material is impregnated with a gas and the resin is formed by melt extrusion. This method is disadvantageous in that the pressure should be reduced to a certain value during extrusion molding and it is very difficult to keep constant the extent of foaming. The third method is based on gas injection, in which a gas at a certain pressure is injected into the extruder. This method provides foamed plastics having a uniform extent of foaming, but is disadvantageous in that the extruder requires a special structure and expensive auxiliary equipment is required to keep the gas at a constant pressure. Thus, the present invention is intended to provide foamed plastics which can be molded economically without the aforesaid disadvantages of conventional methods.

BRIEF DESCRIPTION OF THE INVENTION

According to this invention, the foamed plastics are melt-molded from a mixture of a resin matrix and stretched porous resin fragments mixed thereinto. This molding process causes the air entrapped in the stretched porous resin fragments to expand during melt-molding, forming foamed plastics with bubbles in the resin matrix. The extent of foaming of the foamed plastics can be controlled by keeping the porosity and size of the stretched porous resin fragments uniform. Thus foamed plastics can consistently be prepared economically. In the foamed plastics of this invention, the stretched porous resin fragments remain in the resin matrix, functioning as reinforcement that keeps the mechanical strength of the foamed plastics constant.

DESCRIPTION OF THE PREFERRED EMBODIMENTS

The invention is described in detail with reference to the following examples.

At first, stretched porous resin fragments are prepared. If polytetrafluoroethylene resin is used for the stretched porous resin fragments, the polytetrafluoroethylene resin is formed into 0.01 to 0.1 mm thick tape or sheet according to the method as disclosed in U.S. Pat. No. 3,953,566, and this tape or sheet is punched into circular fragments 0.01 mm to 0.1 mm in diameter or cut into triangular or polygonal fragments having a side of 0.01 to 0.1 mm. The preferable porosity is 40% to 99%.

The stretched porous resin fragments of polytetrafluoroethylene resin thus prepared are mixed as much as 10% to 80% by volume into pellets of, for example, tetrafluoroethylene-perfluoroalkyl vinyl ether copolymer resin, and the mixture is molded by melt-extrusion. The resulting foamed plastics, which are composed of tetrafluoroethylene-perfluoroalkyl vinyl ether copolymer resin as a resin matrix and polytetrafluoroethylene resin as stretched porous resin fragments, are superior in corrosion resistance and electrical properties. Incidentally, it is also possible to mix previously a blowing agent into the stretched porous resin fragments.

Figure 1:
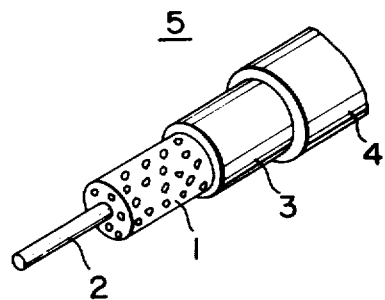
FIG. 1 is a perspective view of a coaxial electrical cable covered with a foamed plastic of this invention.

FIG. 1 shows a perspective view of a coaxial cable 5 which is produced by melt-extruding the foamed plastic 1 prepared above, in which the resin matrix is tetrafluoroethylene-perfluoroalkyl vinyl ether copolymer resin, onto the core conductor 2 and then covering the external surface with the outer conductor 3 and the jacket 4.

Figure 2:
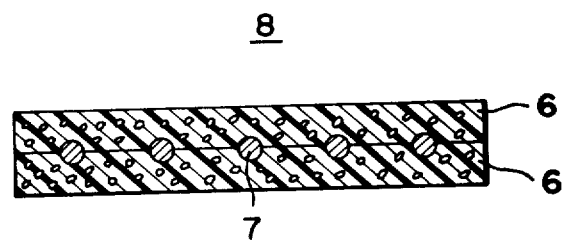
FIG. 2 is a sectional view of a flat electrical cable covered with the foamed plastic of this invention in sheet form.

FIG. 2 shows a sectional view of a flat cable 8 which is produced by fusion-bonding two pieces of sheetlike foamed plastic 6, with a plurality of conductors 7 arranged in parallel between them.

As described above, according to this invention, the stable foamed plastics are prepared easily and economically by mixing stretched porous resin fragments into a resin matrix. These foamed plastics are high in mechanical strength, and are suitable for wire and cable insulation owing to their low dielectric constant. Also stretched porous resin fragments, i.e., stretched porous polypropylene resin fragments and stretched porous polyethylene resin fragments can be used in addition to the resin used in the above examples. As the resin matrix, a variety of thermoplastic resins can be used in addition to the resin used in the above examples.

This invention is not limited to the aforesaid examples, but it will be understood that changes can be made without departing from the scope of the invention, by mixing a filler such as coloring agent into the resin matrix or stretched porous resin fragments, or both.

I claim:

1. A melt molded foamed plastic composition comprising a tetrafluoroethylene-perfluoroalkyl vinyl ether copolymer resin matrix and stretched porous resin fragments selected from the group consisting of polytetrafluoroethylene, polyethylene and polypropylene wherein said porous fragments have a porosity of 40 to 90%.

* * * * *